June 22, 1948.  E. D. BLODGETT  2,443,718
DIRECTION FINDER
Filed March 28, 1945  2 Sheets-Sheet 1
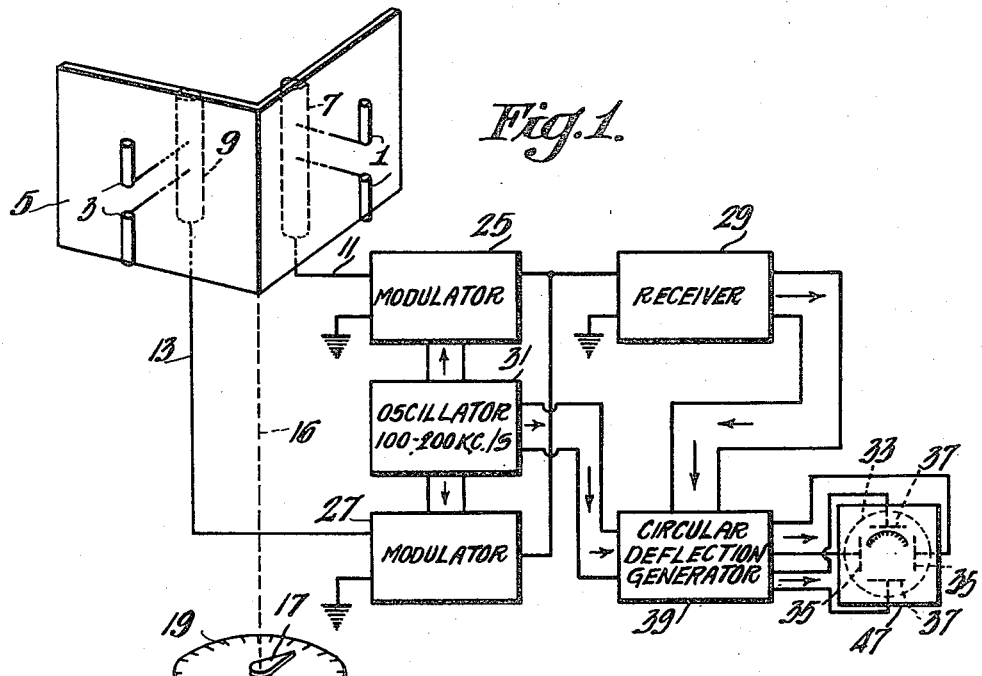
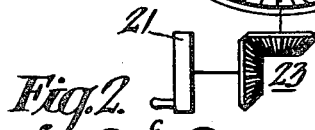
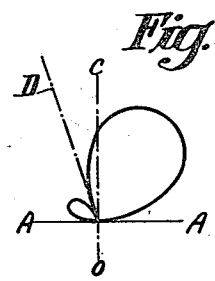
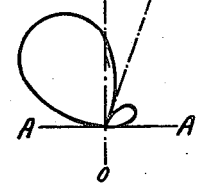
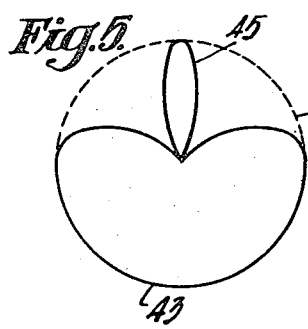
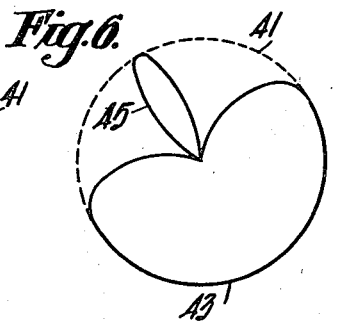
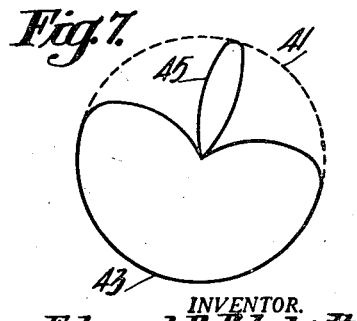
INVENTOR.
Edward D. Blodgett
BY
ATTORNEY June 22, 1948. E. D. BLODGETT 2,443,718
DIRECTION FINDER
Filed March 28, 1945 2 Sheets-Sheet 2

INVENTOR.
Edward D. Blodgett
BY C.D. Tuska
ATTORNEY

Patented June 22, 1948

2,443,718

UNITED STATES PATENT OFFICE 2,443,718

DIRECTION FINDER

Edward D. Blodgett, Haddonfield, N. J., assignor to Radio Corporation of America, a corporation of Delaware Application March 28, 1945, Serial No. 585,213

3 Claims. (Cl. 343—121)

This invention relates to radio direction finders, and more particularly to improved systems suitable especially for determining the bearings of high frequency pulse-modulated signals, such as are employed by various radio systems, for example, radar. Certain aspects of the invention are equally useful in other types of service, as will become apparent hereinafter.

The principal object of the instant invention is to provide improved methods of and means for determining the direction of arrival of radio waves.

Another object is to provide improved variable-directivity antenna systems for direction finders.

A further object is to provide improved cathode ray indicator systems for direction finders.

Figure 8:
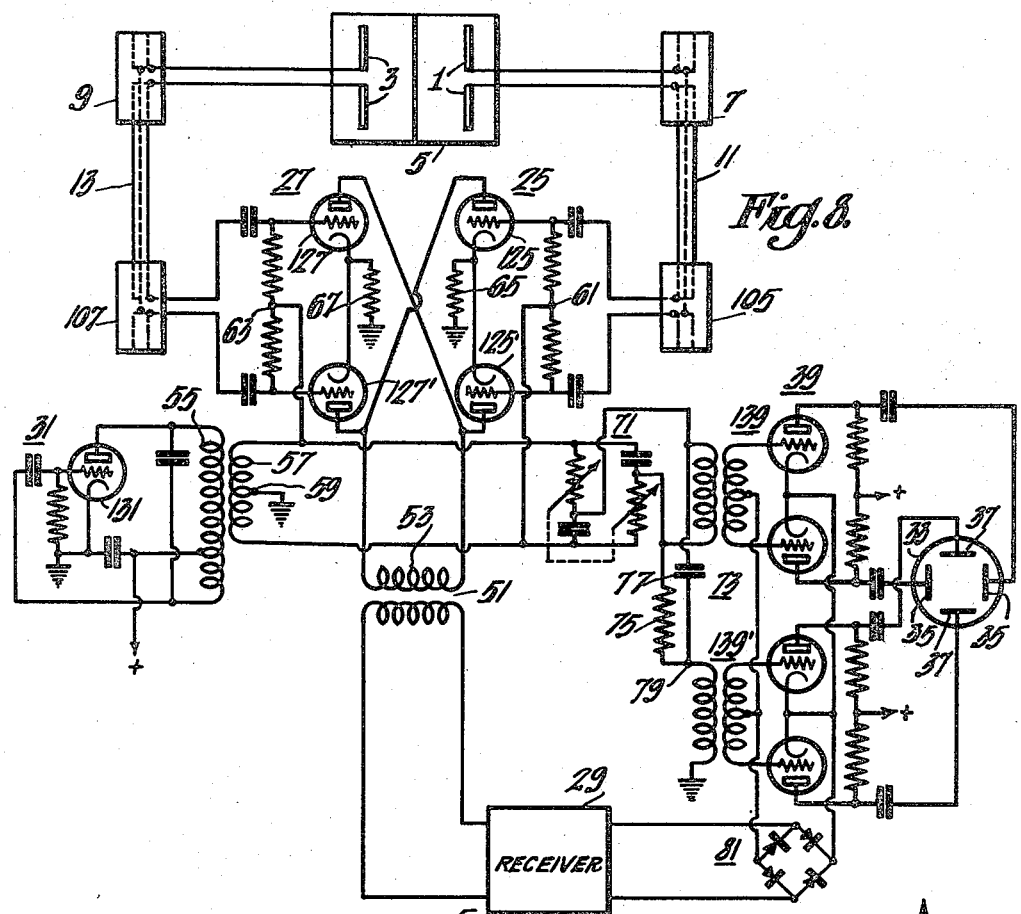
Figure 9:
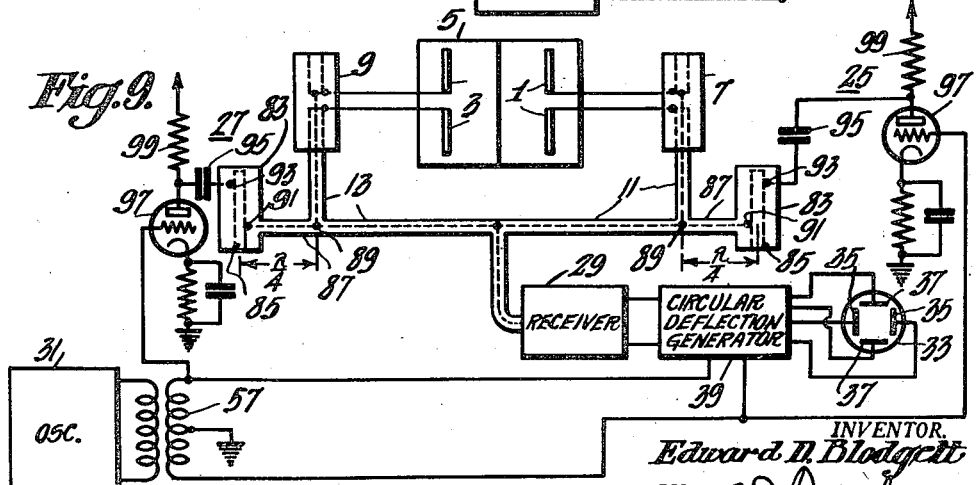

These and other objects will become evident to those skilled in the art upon consideration of the following description, with reference to the accompanying drawings, of which:

Figure 1 is a schematic block diagram of a direction finder embodying the present invention, Figures 2, 3 and 4 are polar graphs of directive patterns of the antenna system of Figure 1, which occur in the operation thereof, Figures 5, 6 and 7 are illustrations of typical patterns produced on the screen of the cathode ray indicator in the system of Figure 1, Figure 8 is a schematic circuit diagram of the system of Figure 1, and Figure 9 is a schematic diagram of a modification of the system of Figure 8.

In accordance with the present invention, it is proposed to employ an antenna having a directive pattern with one sharply defined null, and "scan" through an arc of perhaps 100 degrees, by cyclically varying the directive pattern so that the null sweeps rhythmically back and forth. The variation in received signal with variation in directive pattern is indicated on the fluorescent screen of a cathode ray tube in such manner as to show the angular relationship between the position of the antenna and the direction of signal arrival.

Referring to Figure 1, a pair of vertical dipoles 1 and 3 are provided in front of a corner reflector screen 5. The dipoles 1 and 3 are spaced one quarter wavelength or less from the reflector 5. The reflector 5 may be a homogenous sheet of conductive material, or may be a screen formed of wires or parallel rods, in accordance with well-known practice.

The dipoles 1 and 3 are connected to line balance convertors 7 and 9, respectively, which are in turn connected to coaxial transmission lines 11 and 13. The convertors 7 and 9 may be of the type described on page 855 of Radio Engineers Handbook by F. E. Terman, published by McGraw-Hill Book Company in 1943. The antenna array is supported for rotation about a vertical axis by means of a shaft 16 (indicated by dash line in Figure 1). The shaft 16 is provided with a pointer 17 and a cooperating azimuth scale 19, and is arranged to be rotated by a handwheel 21, coupled thereto by gears 23.

The transmission lines 11 and 13 are connected to modulators 25 and 27, respectively. The outputs of the modulators 25 and 27 are connected together to a radio receiver 29, in such manner that their outputs oppose and tend to cancel each other at the input to the receiver. A local oscillator 31 is connected to the modulation input circuits of the modulators 25 and 27 in opposite phases, so that as the transmission through the modulator 25 is increased, the transmission through the modulator 27 is decreased, and vice versa. The oscillator 31 is designed preferably to operate at a frequency of the order of 100 to 200 kilocycles per second.

A cathode ray tube 33, of usual construction, includes orthogonally related deflection means such as horizontal deflection plates 35 and vertical deflection plates 37, which are connected to respective output circuits of a circular deflection generator 39. The deflection generator 39 is connected to the oscillator 31, and includes a phase splitting circuit or the equivalent for providing two voltages similar to the output of the oscillator 31, but in quadrature phase with respect to each other. The generator 39 also includes modulator means connected to the output of the receiver 29 to control the amplitudes of the quadrature output voltages as a predetermined function of the amplitude of the receiver output. In the practice of the present invention, it is preferred to arrange the connections so that an increase in receiver output decreases the deflection generator output, and vice versa.

The operation of the system of Figure 1 is as follows: Radio energy striking the antennas 1 and 3 induces voltages therein which are applied to the balanced terminals of the convertors 7 and 9. The convertors, by auto transformer action, apply corresponding voltages to the coaxial lines 11 and 13. In addition to facilitating the use of coaxial, unbalanced-to-ground lines for the downleads, the convertors 7 and 9 perform the valuable function of discriminating against voltages induced in the antenna system by horizontally polarized field components, thus reducing the possibility of so-called polarization error in the operation of the system. This discrimination results from the fact that the convertor acts as a high impedance across the dipole (and the corresponding line) for currents flowing out of one dipole element and into the other, and acts as a short circuit for currents which flow into or out of both elements of the dipole in phase. The latter type of current flow is characteristic of that produced by horizontally polarized fields. Assume temporarily that the lines 11 and 13 are connected directly to the receiver 29, so that the full outputs of the two dipoles oppose each other at the receiver input. As the antenna array is rotated about its vertical axis, the receiver output in response to a signal arriving from a given direction will vary according to the directive pattern of the array. This pattern is shown in Figure 2, where the lines A—A represents the vertical plane of the dipoles 1 and 3. The pattern is seen to comprise two lobes symmetrically disposed about a null line O—C. It is actually a figure-of-eight pattern of the type usually provided by differentially connected spaced antennas, but distorted by the reflector 5 so that the two lobes extend forwardly of the plane A—A. This characteristic has two desirable results; first, the forward null, along the line O—C, is sharper than that of a normal figure-of-eight pattern, and second, the rearward or reciprocal null is much broader, so that there is no ambiguity between the two nulls, and no "sense" antenna is required.

The pattern of Figure 2 is the same shape as that provided in the system of Figure 1 when the transmissions through the modulators 25 and 27 are equal. If the transmission through the modulator 25 is decreased and that through the modulator 27 is increased, the directive pattern becomes like that shown in Figure 3, with the null lying along a line O—D, to the left of the line O—C. The angle DOC depends upon the relative transmissions through the two modulators. The null is to the right of the line OC, as shown in Figure 4, if the transmission through modulator 25 is greater than that through the modulator 27.

The oscillator 31 varies the transmissions through the modulators 25 and 27 cyclically and in opposite directions, effectively varying the directive pattern from that of Figure 3, through that of Figure 2, to that of Figure 4, and back again, at a rate corresponding to the frequency of the oscillator. If a signal is being picked up by the antenna system, the output of the receiver 29 will vary accordingly, from substantially zero at the instants the null line coincides with the line of signal arrival, to a maximum value when the directive pattern is positioned to provide maximum pickup in the direction of arrival.

The oscillator 31, through the deflection generator circuit 39, energizes the plates 35 and 37 of the tube 33 in quadrature phase, causing the cathode ray beam to traverse cyclically a closed path. The circuits are adjusted so that in the absence of variation in the output of the receiver 29, the path traced by the cathode ray beam will be a circle. The radius of this circle is proportional to the output of the oscillator 31, which is constant, times the transmission of the oscillator output through the deflection generator 39. This transmission is an inverse function of the amplitude of the receiver output, i. e., if the receiver output is zero, the circle will be of maximum radius, and with maximum receiver output, the radius will be zero.

A signal arriving along the axis O—C, perpendicular to the plane of the reflector 5, will produce a trace of the type shown in Figure 5 on the face of the cathode ray tube 33. The dash line 41 indicates the trace which would be produced in the absence of output from the receiver 29. The trace comprises an arcuate portion 43 of about 180 degrees, and a sharp lobe 45. An index line or a scale, such as a transparent sheet 47 (Figure 1) marked off in angular measure, may be placed near the screen of the cathode ray tube to indicate the position of the lobe 45.

If the signal arrives from the left of the line O—C, the trace is of the form shown in Figure 6, with the lobe 45 deflected to the left. Similarly, the lobe 45 is deflected to the right (Figure 7) in response to a signal arriving from the right of the line O—C.

The angle of deflection of the cathode ray pattern is not directly proportional to the angle of signal arrival with respect to the line O—C. The calibrations on the sheet 47 may be made non-uniform to provide approximately correct direct indications of azimuth. However, it is preferred to employ the described indications merely to show which way the shaft 16 must be turned to bring the null of the equi-signal pattern of Figure 2 to bear upon the direction of signal arrival, and note the position of the pointer 17 on the scale 19 when the pattern of Figure 5 is produced on the cathode ray tube 33.

The described system lends itself well to the detection of pulsed radar signals, high speed telegraphic transmissions, etc. because the pattern is swept throughout an azimuth range of about 100 degrees every five or ten microseconds, depending upon the frequency of the oscillator 31. As mentioned above, approximate bearings may be taken almost instantaneously by means of the cathode ray tube, and exact bearings may be determined by rotating the antenna array.

Referring to Figure 8, the circuit details of one form of the system of Figure 1 are shown. The modulators 25 and 27 comprise push-pull connected pairs of tubes 125, 125' and 127, 127', respectively. Line balance convertors 105 and 107 couple the lines 11 and 13 to the grid circuits of the respective modulators. A common output transformer 51 is provided, with one side of its primary 53 connected to the anodes of the tubes 125 and 127', and the other side connected to the anodes of the tubes 125' and 127. Thus the outputs of the modulators 25 and 27 are opposed to each other. The secondary of the transformer 51 is connected to the receiver 29, which may be of conventional design and hence not shown in detail.

The local oscillator 31 comprises a tube 131 connected in an ordinary Hartley circuit including a tank coil 55. The coil 55 is coupled to a coil 57, provided with a grounded center tap 59. One side of the coil 57 is connected to the common grid return point 61 of the modulator 25, and the other side is connected to the corresponding point 63 of the modulator 27. The cathodes of the tubes 125, 125' and 127, 127' are connected to ground through bias resistors 65 and 67.

The circular deflection generator 39 comprises two variable gain amplifier circuits 139 and 139', each including a pair of push-pull connected tubes with their anode circuits coupled to the deflection plates 35 and 37, respectively, of the cathode ray tube 33. The input circuits of the amplifiers 139 and 139' are both connected through an adjustable phase shifter 71 to the oscillator output coil 57. The phase shifter is shown as the well-known bridge type. The purpose of the phase shifter 71 is to provide an installation adjustment of the angular relationship between the antenna array and the cathode ray indicator. Once properly adjusted, it is left alone.

The input circuits of the amplifiers 139 and 139' are identical except for the inclusion of a 90 degree phase shifter 73 in that of the amplifier 139'. The phase shifter 73 comprises a resistor 75 and a capacitor 77 connected in series with each other across the output of the phase shifter 71. The input to the amplifier 139' is taken between the common junction 79 and ground. The values of the resistor 75 and the capacitor 77 are such that the resistance is equal to the capacitive reactance at the frequency of the oscillator 31. The voltage between the point 79 and ground will then be in quadrature phase with that across the output of the phase shifter 71. To provide a circular base line on the cathode ray tube 33, the gain of the amplifier 139' must be made twice that of the amplifier 139, because the quadrature voltage applied thereto will be one half the input to the amplifier 139. This consideration may be avoided by substituting a phase shifter like the phase shifter 71 for the phase shifter 73, or by other arrangements which will be equally obvious to those skilled in the art.

The grid return circuits of the amplifiers 139 and 139' are connected in parallel with each other to a rectifier 81, which is connected to the output of the receiver 29. The connections are such that increase in the receiver output increases the negative bias applied to the amplifier grids, thereby decreasing the gains and reducing the deflection voltages applied to the tube 33.

The operation of the system of Figure 8 is identical with that of Figure 1, as already described. The circuits shown in Figure 8 are merely typical arrangements, and are by no means the only possible ones. For example, the system shown in Figure 9 is also the equivalent of the block diagram of Figure 1.

In the system of Figure 9, the modulator 25 comprises a coaxial line stub 83, short-circuited at its lower end 85. The line 83 is approximately ¼ wavelength long, so as to be parallel resonant. A quarter wavelength coaxial line section is connected to a point 89 on the downlead 11 from the dipole, and extends to a point 91 on the inner conductor of the stub line 83. A point 93 near the upper end of the inner conductor of the stub 83 is coupled through a capacitor 95 to the anode of a tube 97. The tube 97 is provided with a load resistor 99. The control grid of the tube 97 is connected to one side of the oscillator coupling coil 57.

The modulator 27 is identical with the modulator 25, except that the control grid is connected to the opposite side of the oscillator output. Corresponding elements of the modulators 25 and 27 are designated by similar reference numerals.

The operation of the modulators of Figure 9 is as follows: When the control grid of the tube 97 is highly negative with respect to the cathode, the tube presents a high impedance between the point 93 and ground. The stub 83 then acts as a parallel resonant circuit, presenting a high impedance between the point 91 and ground. The quarter wave line section 87, owing to the well known impedance inversion characteristic of quarter wave lines, converts the high impedance at the point 91 to a low impedance, substantially a short circuit, at the point 89. Thus no energy is transmitted past the point 89 to the receiver 29.

At the same time as the modulator 25 short-circuits the line 11 from the antenna 1, the modulator 27 places a very high impedance across the line B at the point 89. This results from the fact that the control grid of the tube 97 in the modulator 27 is not highly negative (and may even be positive) with respect to the cathode, causing the tube to present a low impedance at the point 93 on the stub line 83. The low impedance is stepped down by auto transformer action so as to present substantially a short circuit at the lower tap 91. The low impedance of the point 91 is inverted to an extremely high impedance at the point 89 on the line 13. During each cycle of the output of the oscillator 31, the above-described conditions of the modulators 25 and 27 are interchanged, thus increasing and decreasing the respective transmissions from the dipoles 1 and 3 to the receiver 29. The remainder of the system of Figure 9 may be identical with that of Figure 8, and the operation is the same.

The invention has been described as an improved method of radio direction finding, using a directive antenna with one sharply defined null in its pattern, cyclically varying the directive pattern so that the null sweeps back and forth, and indicating the resulting variation in received signal strength on a cathode ray tube. The described indicator system includes means providing a circular base line on the cathode ray screen, and means for deflecting the cathode ray beam radially inward from said base line as a function of received signal amplitude. This arrangement produces characteristic patterns on the screen which show the angular relationship between the position of the antenna and the line of signal arrival.

I claim as my invention:

1. The method of indicating on the screen of a conventional cathode ray oscilloscope tube the direction of arrival of a radio wave, comprising the steps of receiving said wave separately in two directive patterns to provide two like signal voltages related in amplitude to each other in accordance with the direction of arrival of said wave, modulating said two voltages in complementary fashion so that one is decreased as the other is increased and vice versa, combining said voltages differentially to produce a resultant voltage, producing a normally circular trace on the screen of said cathode ray tubes, and varying the radius of said trace inversely as the amplitude of said resultant voltage.

2. A radio direction finder including an antenna comprising at least two differently directed antenna elements, a radio receiver, means for applying the outputs of said elements in opposition to each other to said receiver, means for cyclically varying the amplitudes of said outputs in respectively opposite senses, a cathode ray tube including cathode ray deflection means and a fluorescent screen, a circular deflection generator circuit connected to said deflection means to provide rotary motion of said beam in a closed path, and means responsive to the output of said receiver to vary the radius of said path inversely as the amplitude of said output.

3. A radio direction finder including an antenna array rotatable about a vertical axis and comprising a reflector screen and at least one pair of spaced antenna elements in cooperative relationship with said screen to provide differently directed response patterns, means for indicating the angular position of said array, a line balance transformer connected to each of said elements, a transmission line connected to each of said transformers, a radio receiver, means for applying the outputs of said lines to said receiver in opposition to each other, said means including a modulator connected between each of said lines and said receiver, a local oscillator connected to said modulators in respectively opposite phases, a cathode ray tube including a fluorescent screen and cathode ray deflection means, a deflection circuit connected to said oscillator and to said deflection means to deflect the cathode ray of said tube in a circular path, and means responsive to the output of said receiver to vary the radius of said path inversely as the amplitude of said receiver output.

EDWARD D. BLODGETT.

REFERENCES CITED

The following references are of record in the file of this patent:

UNITED STATES PATENTS

| Number | Name | Date |
| --- | --- | --- |
| 2,238,129 | Paul | Apr. 15, 1941 |
| 2,268,085 | Roberts | Dec. 30, 1941 |